Nov. 10, 1970 E. H. STUPP ET AL 3,540,011

ALL SOLID STATE RADIATION IMAGERS

Filed Sept. 6, 1968 5 Sheets-Sheet 1

INVENTORS.
EDWARD H. STUPP
PIETER G. CATH
ZSOLT SZILAGYI

BY Frank R. Trifari
AGENT

INVENTORS.
EDWARD H. STUPP
PIETER G. CATH
ZOLST SZILAGYI
BY
AGENT

INVENTORS.
EDWARD H. STUPP
PIETER G. CATH
ZSOLT SZILAGYI
BY
AGENT

ALL SOLID STATE RADIATION IMAGERS

INVENTORS.
EDWARD H. STUPP
PIETER G. CATH
ZOLT SZILAGYI
BY
AGENT

Nov. 10, 1970 E. H. STUPP ETAL 3,540,011

ALL SOLID STATE RADIATION IMAGERS

Filed Sept. 6, 1968 5 Sheets-Sheet 5

INVENTORS.
EDWARD H. STUPP
PIETER G. CATH
ZSOLT SZILAGYI

BY Frank R. Trifari
AGENT

United States Patent Office 3,540,011

Patented Nov. 10, 1970

3,540,011

ALL SOLID STATE RADIATION IMAGERS

Edward H. Stupp, Spring Valley, Pieter G. Cath, Briarcliff, and Zsolt Szilagyi, Ossining, N.Y., assignors, by mesne assignments, to U.S. Philips Corporation, New York, N.Y., a corporation of Delaware Filed Sept. 6, 1968, Ser. No. 758,086
Int. Cl. G11c *11/36, 11/42*
U.S. Cl. 340—173 5 Claims

ABSTRACT OF THE DISCLOSURE

A flat screen target for receiving and storing an optical image is composed of an array of photosensitive diode elements each serially connected with a capacitor to form an array of two terminal devices having each of their respective first terminals interconnected along a plurality of row lines and each of their respective second terminals connected along a plurality of column lines. Sequential coincident pulses are applied along respective row and column lines for reading the stored condition of each two terminal device.

This invention relates to image sensing devices and particularly to a solid state image sensing device employing an electronically sampled array of photodiodes.

Conventional image sensing devices are exemplified in the device known as a vidicon wherein a target area is composed of a suitable photoconductive material placed along a signal plate or transparent conductive coating which in turn forms the inner surface of a glass face through which an image enters. A scanning beam is provided by a thermionic cathode and controlled by means of deflection and focussing coils. A fixed potential, positive with respect to the cathode, is applied to the signal plate. The beam deposits electrons on the inner surface of the photoconductive layer, resulting in the placement of a high charge differential across the photoconductive layer. Since the photoconductive layer has a low natural conduction, only a small quantity of charge will flow across the layer in the absence of incident light. This is the dark current level. When an image is focussed on the target, conductivity of the photoconductive layer increases in the illuminated portion and charge flows across the layer. The electron beam, in striking these areas, will deposit sufficient electrons on the areas to re-establish the original charge, and the current flowing in the external circuit due to this re-establishment produces a signal proportional to the charge deficiency. Where there is no charge depletion, the surface charge repels the beam and a minimal signal is observed. This would correspond to the dark current of the image sensing device.

A subsequent improvement of the foregoing arrangement is to provide a beam scanned target surface composed of an array of electrically isolated reverse-biased diodes. In this case the information is stored on the electron beam charged diodes in the form of a charge deficiency as a result of light focussed on the diode array, and is read out by the electron beam. Each of the diode junctions exhibit a space charge depletion effect whereby each diode will be discharged to a degree proportional to the number of absorbed photons because the absorbed photons produce hole electron pairs which increase the transfer of charge across the diode junction. Application of the electron beam will restore the original charge. The signal produced during restoration will be proportional to the amount of light, or the number of absorbed photons, originally incident on the diode, subsequent to the previous electron beam application.

The requirements for an image sensing detector include the ability of the device to integrate the total incident light during each frame time. Further, it is desirable that the output signal be linearly proportional to the input light intensity, and thereby maintain the response characteristic gamma factor at unity. In color imaging particularly, it is important that in order to be able to combine light of differing wavelengths and of differing intensities, the target area should respond with a unity or linear gamma characteristic. The sensor must be able to store the radiant information for periods up to a frame time. There should be no distinguishing between photons arriving near the beginning or end of the frame. The detector should also have a minimal cross talk factor, i.e., the diode elements should optimally be electrically isolated from one another.

Present systems, employing vacuum tube structure, suffer from such disadvantages as short life and fragility. Further difficulties and disadvantages, such as synchronization, the need for high voltage circuitry and the like are attendant with the use of a beam device for performing the scan function. Elimination of the beam scanning apparatus by an electronic scanning mechanism would have the desirable effect of reducing the overall size of the camera, and the reduction in power circuit requirements normally required for generating cathode heating and deflection currents.

It is accordingly a prime object of the invention to provide an image sensing target area array which can be more easily constructed, with integrated circuit techniques, than present arrays.

It is a further object of the invention to construct an image sensing target area which will integrate over each frame time and maintain a response characteristic gamma of unity.

It is still a further object of this invention to employ an electronic scanning mechanism which will read out the stored image condition on the target area of this invention without destroying any of the advantages of a beam-scanned array.

It is another object of this invention to employ an electronic scanning mechanism which will be more easily packaged, occupy less volume, and employ less powering and drive requirements than heretofore achievable with beam scanning techniques.

The foregoing objects are realized by constructing a target area with a matrix array of photosensitive diodes, each of the diodes being connected in series with a capacitor to form a connection at the crossover point. Each individual capacitor serves as an isolation element which stores charge such that its corresponding diode is held under reverse bias while it is not being interrogated. Further, each capacitor represents a high impedance during non-scan times and a low impedance when pulses are applied, and thereby prevents leakage current through the diodes which are not being scanned from removing any stored charge level on the remaining diodes. The diode-capacitor combinations are arrayed in a matrix at the respective crossing points of adjacent row and column conductors. Scanning and recharging is accomplished by a coincident pulsing system having relative polarity levels which serve to accomplish the selection of an element in the sensor and re-establishing the reverse bias normally associated with the conventional electron beam arrangements.

The entire array may be formed on a wafer of semiconductor material employing integrated circuit techniques.

The foregoing objects of the present invention will be more clearly understood by the following detailed disclosure and with reference to the appended drawings, in which.

Figure 3A:
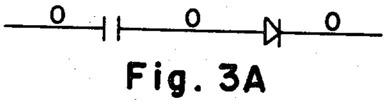
Figure 3B:
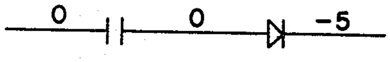
Figure 3C:
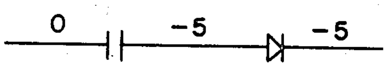
Figure 3D:
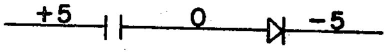
Figure 3E:
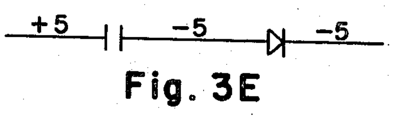
Figure 3F:
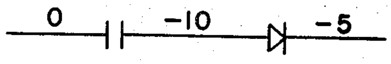
Figure 3G:
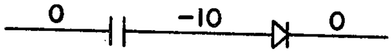
Figure 3H:
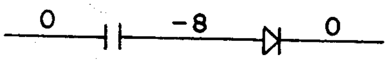
Figure 3I:
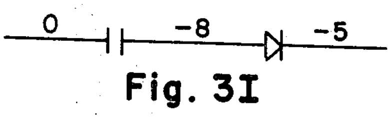
Figure 3J:
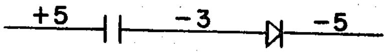
Figure 3K:
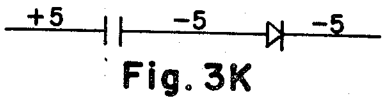
Figure 3L:
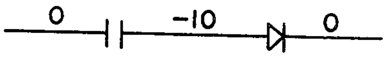
Figure 3M:
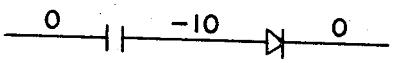
Figure 3N:
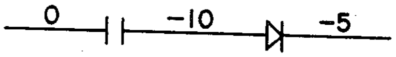
Figure 3O:
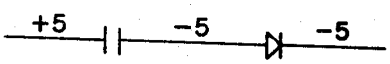
Figure 3P:
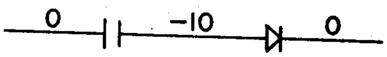
Figure 4:
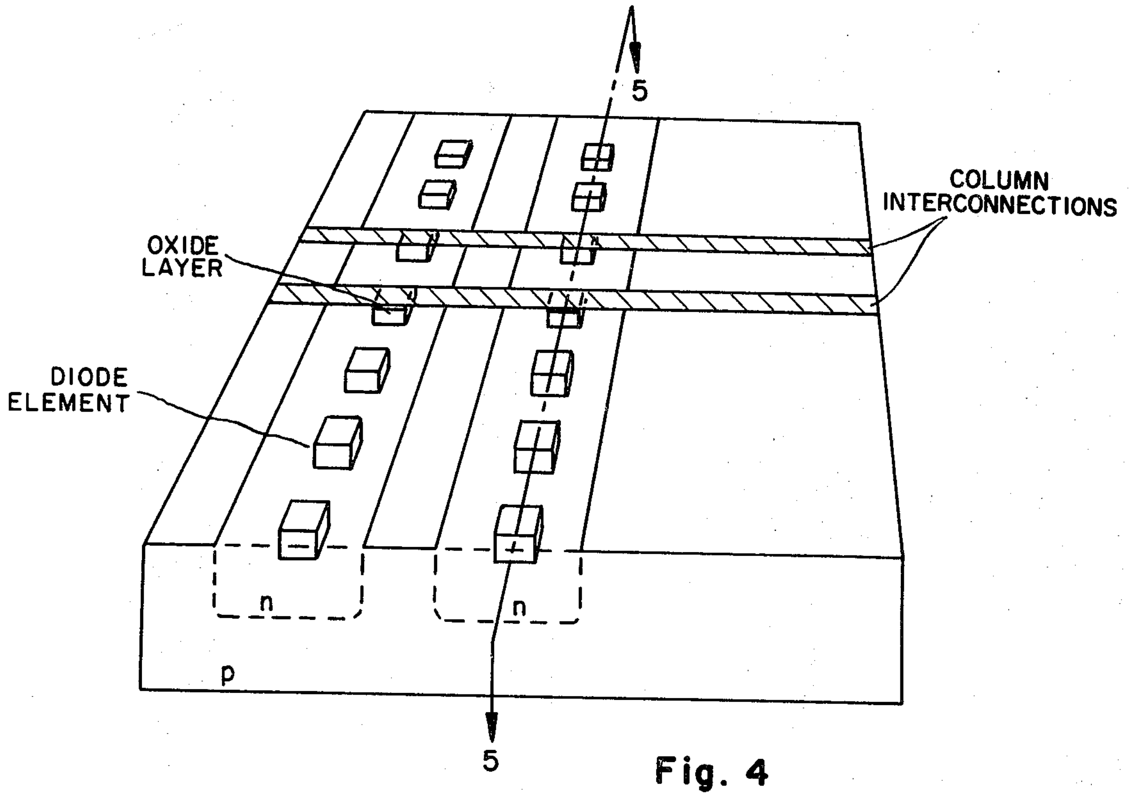
Figure 5:
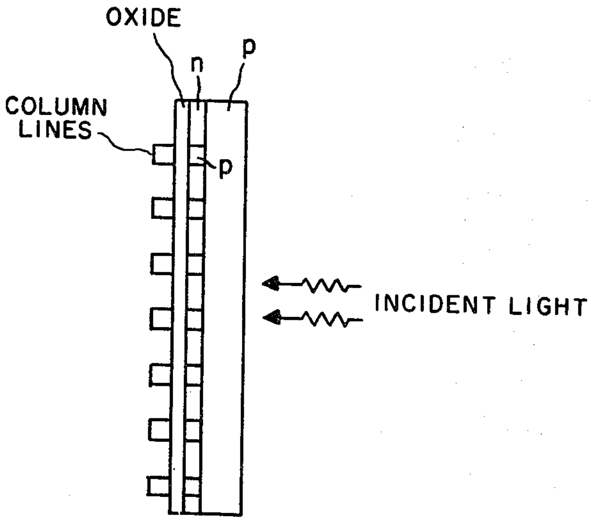

FIGS. 3A–P illustrate an example of relative levels present on the diode-capacitor combination for varying conditions, and FIG. 4 illustrates a semiconductor structure which can be utilized to construct the array of the invention;

FIG. 5 illustrates a cross-sectional view of FIG. 4.

Referring to FIG. 1, a four by four array is illustrated in a matrix arrangement of circuit elements each consisting of a photo-sensitive diode 10 and capacitor 11 connected in series.

Each of the circuit elements are commonly connected along a plurality of row and column lines which serve to couple scanning pulses to the respective circuits by use of a coincident pulsing scheme. The column lines are each connected to a column pulse distributor 12 which may, in this embodiment, comprise a sequential series of stages $C_1$, $C_2$, $C_3$, $C_4$, each respectively coupled to a column line. Each of the row lines has connected thereto a row pulse distributor 13 which may similarly comprise a sequential series of stages $R_1$, $R_2$, $R_3$, $R_4$, each respectievly coupled to a row line.

Figure 1A:
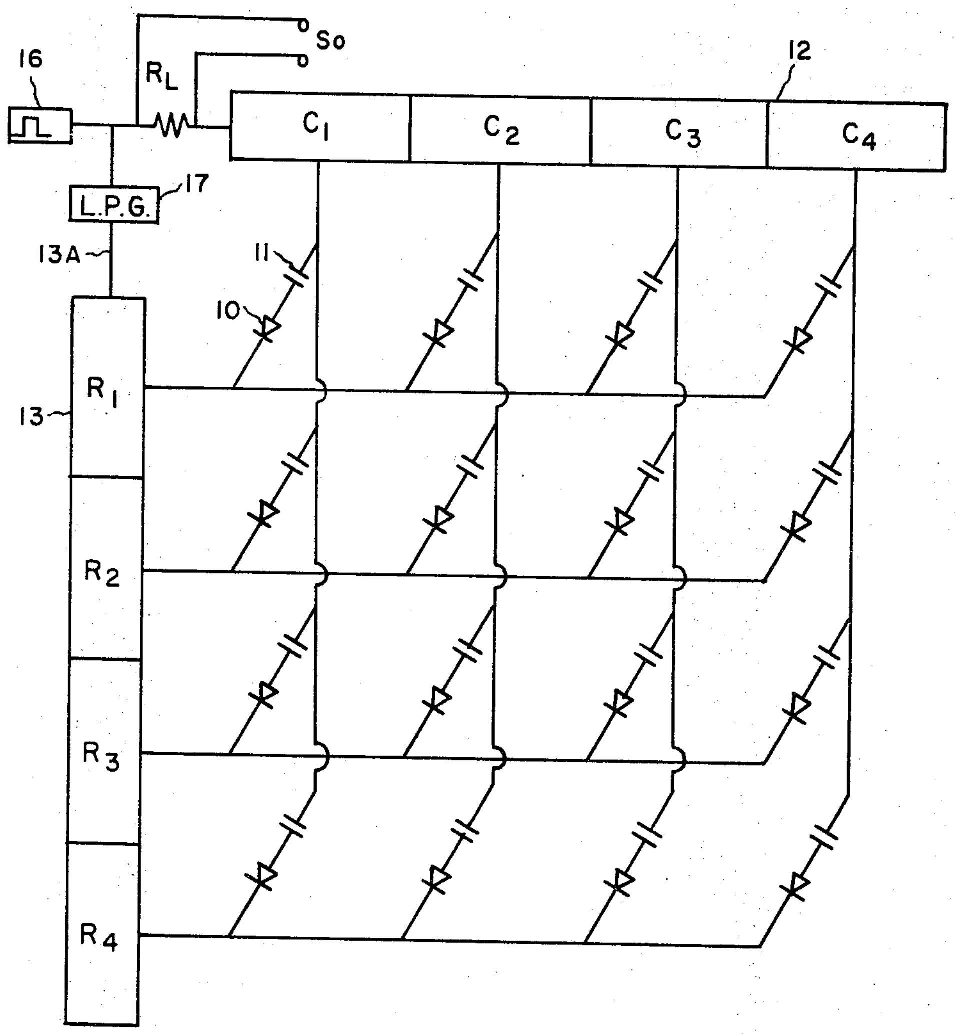
FIG. 1A is a schematic diagram of the array of the present invention.
Figure 1B:
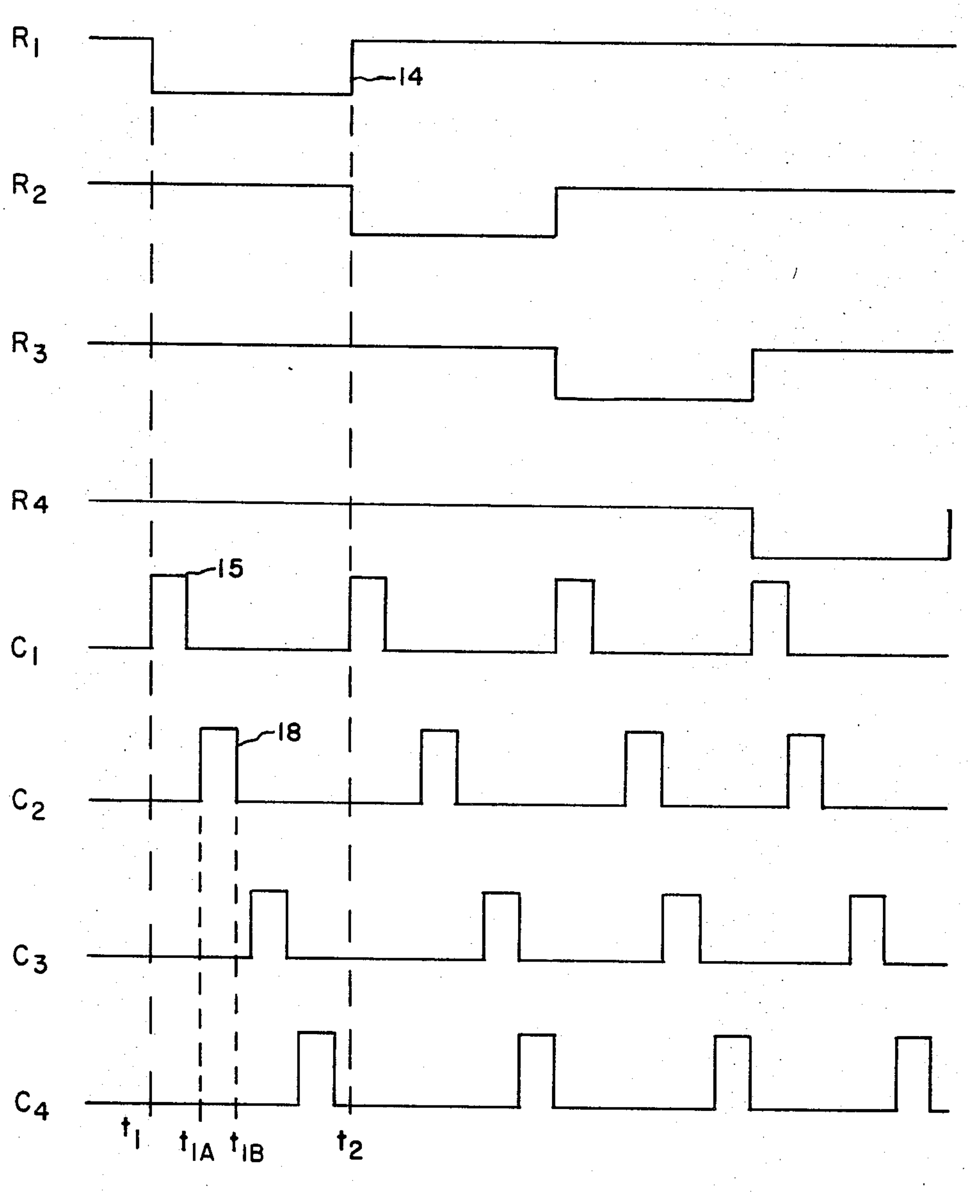
FIG. 1B illustrates the waveforms of voltages applied to the array of FIG. 1A.

Since each diode in the array will contain information concerning an incident light pattern during a specific frame period, in a manner described further below, it is important to be able to obtain the information available in each diode in a known sequence without interfering with the remaining elemental circuits. This is accomplished by means of the relative pulse timing of the row and column distributors. Referring to FIG. 1B, an illustration of the pulse timing is presented in the form of a voltage-time diagram, the height of the respective pulses designating voltage, whereas the durtion designates time. All of the ordinate lines $R_1$, $R_2$, $R_3$, $R_4$, $C_1$, $C_2$, $C_3$, $C_4$, are drawn with a common time base. The interrogation scan begins with the application of a row pulse 14 (FIG. 1B) having a time duration of $t_1$–$t_2$ to the first row. During this time intervals, pulses with a duration of $(t_1-t_2)/n$, where $n$ is the number of vertical columns, are applied successively to each of the vertical columns. This effectively completes the interrogation of the first row, and the cycle is repeated for successive rows.

The scanning operation is accomplished by coincidental-sequential pulsing of each diode-capacitor element in the array. As shown in FIG. 1B the row line pulse $R_1$ corresponding to stage $R_1$ of the generator 13 in FIG. 1A is provided with a first pulse 14 having a duration existing between times $t_1$ and $t_2$ so as to provide a first potential on one terminal of each of the diode-capacitor elements coupled along the row line terminating at $R_1$. During the $t_1$–$t_2$ time period, the column generator provides a sequential series of pulses along each of the column lines $C_1$, $C_2$, $C_3$, $C_4$, beginning at time $t_1$ with a first pulse 15 and ending before time $t_2$. In this manner, each diode in the first row is scanned sequentially. The cycle begins again at $t_2$ and repeats itself for the next row in a pattern which continues along each row from left to right until the entire array is scanned. Since only one diode is scanned at any particular time slot, information resulting from that scan can be uniquely identified and a common output may be used. As shown in FIG. 1A, an output load resistor $R_L$ may be directly coupled in the common source line for the column pulse distributor 12. A source of pulses 16 supplies both row and column distributors, the row distributor having a long pulse generator 17 for supplying a pulse series to the row generator which corresponds to those illustrated in FIG. 1B. The source 16 serves as both a supply for the column distributor 12 and as a synchronizing trigger source for the long pulse generator (L.P.G.) 17. The load resistor $R_L$, across which an output signal $S_0$ is derived, is in the column line, but can alternatively be placed in the common row line, for example, at point 13A, without altering the output signal. It is understood that other modes of providing pulses to the array can be utilized, and that variations in numbers of rows and/or columns can certainly be contemplated within the scope of the invention.

Figure 2:
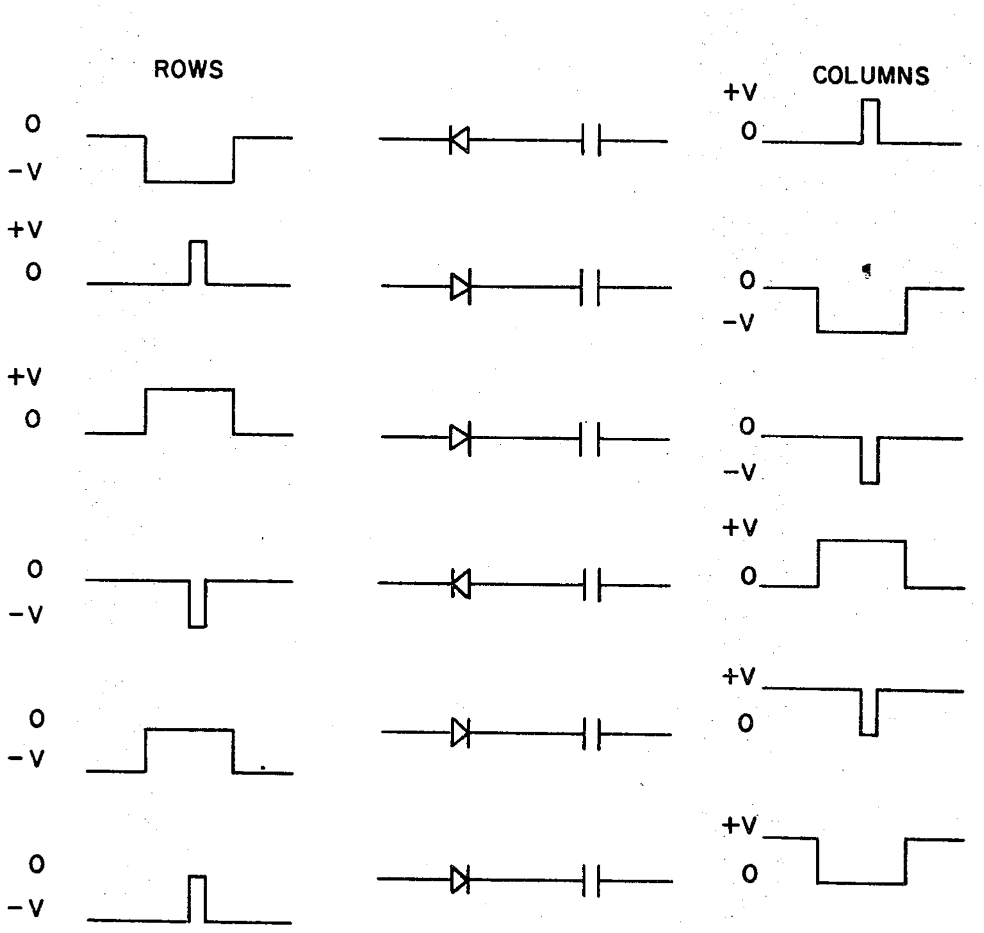
FIG. 2 is a diagram illustrating some of the various waveform configurations which may be employed to charge and scan the capacitor diode combinations.

Turning now to the specifics of the scan operation, the applied pulses can take differing relative forms, as shown by way of example in FIG. 2. The pulse arrangement of row and column can be reversed and polarities of both pulses and diodes reversed; however, the cathode always receives the negative-going pulse, the anode the positive-going pulse. Assuming the relative arrangement of diode polarity and pulse position and polarity to be as described in FIG. 1B, reference is now made to FIGS. 3A–P.

The diode possesses an inherent capacitance and will charge, as will the capacitor associated with it. However, for purposes of the following explanation, it is assumed that the capacitance of the capacitor is significantly larger than the diode capacitance so that all the charge levels can be presumed to be across the capacitor, and the potential at all points in the circuit initially zero (FIG. 3A). For purposes of this explanation, a magnitude of −5 volts is assumed for the voltage pulse now applied at the cathode of the diode (FIG. 3B). This pulse corresponds to the relatively longer row pulse of FIG. 1B, for example, that of stage $R_1$. The diode is now forward biased in a conductive condition, and it will remain in a conductive condition until it is again zero biased. The anode of the diode will thus charge, as a result of the conductive condition of the diode, to the applied negative potential (FIG. 3C). During the duration of the long row pulse, a column pulse 18 is applied (FIG. 3D) to the capacitor terminal. For purposes of this explanation, a magnitude of 5 volts is assumed for this latter pulse, and it will be further assumed that the time is now $t_{1A}$ and the stage concerned is $C_2$ (FIG. 1B). The resultant change in amplitude of the diode anode potential as a result of the application of the 5 volt pulse is identical to the amplitude of the applied positive potential. As a result, the diode is again forward biased until the bias on the diode is zero (FIG. 3E). The short column pulse is then removed, corresponding to time $t_{1B}$ (FIG. 1B). The removal of the positive potential again changes the amplitude of the bias by the same amplitude as the step drop in the applied positive potential (FIG. 3F). The diode is now back biased and does not conduct. The row pulse now terminates, at a time corresponding to $t_2$ (FIG. 1B). The anode potential does not change, however, since the potential removed has been at the cathode of the diode (FIG. 3G). Thus, the pulsing scheme reverse biases the diode.

Assuming now that the diodes of the entire array have been placed in this reverse biased pre-operation condition, it is now appropriate to consider the relative effects of illumination and non-illumination conditions.

For purposes of illustration, the elements considered will be the same as that discussed above, and the time period being the next or a subsequent period between $t_1$ and $t_2$. When incident light is focused on the sensing area of the charge photosensitive array, the effective parallel capacitance of each of the series connected diode and capacitor will lose charge to a degree proportional to the number of incident photons since the photons produce free electron-hole pairs which are separated by the reverse bias and drawn to the respective electrodes. The total charge thus removed at any instant of time is proportional to the integral of illumination during the time elapsed since the previous sampling pulse. The integration time available for each element corresponds to the frame time which, in conventional television, may amount to one-thirtieth of a second. The integration feature of this device thus provides a sensitivity corresponding to comparable conventional television image storage methods.

Readout of the varying levels of decreased charge which represents the stored image in the array may now be explained. The same pulse series as was employed to establish reverse bias on the diodes may be used for readout. Again noting that the presence of incident illumination will decrease the stored charge on each photosensitive diode that receives photons, it is assumed that the diode-capacitance charge level, FIG. 3H, has now been decreased from −10 volts to −8 volts due to the incident illumination. The decrease represents the sum of all the photons incident on the photosensitive diode since the previous sampling, a time duration representing the frame time. When the negative pulse 14 representing the beginning of the cycle at time $t_1$ (FIG. 1B) is placed on the cathode the diode remains back biased (FIG. 3I). When the positive pulse 18 (FIG. 1B) is applied to the capacitor, beginning the interrogation of the charge on the diode-capacitor element, the resulting coupling through renders the diode in a forward biased condition (FIG. 3J). The diode continues to conduct until a zero bias condition is achieved (FIG. 3K). The removal of the column pulse 18 again results in a reverse-biasing condition and renders the diode nonconductive (FIG. 3L). The forward conduction process (FIGS. 3J–3K) results in a restoration of the amount of charge which was leaked off by the incident radiation. The diode thus passes a current which will have an amplitude proportional to the charge deficiency and thereby provides an electrical indication suitable for indicating the magnitude of the charge leaked off. This current flowing through $R_2$ provides the signal. It should be noted that the capacitor performs the function of isolating the diode to prevent leaking of the stored charge. Thus, the capacitor ensures that all of the non-interrogated photosensitive diodes are isolated from each other during that portion of the frame period when not being sampled, thereby minimizing leakage current. Therefore a non-scanned diode will not contaminate any other diode by derogating the full charge level present on other diodes to an extent not reflected by the proportionality of charge reduction to incident illumination. As a result linearity resulting from photon detection by the diode is maintained.

The foregoing feature becomes more important when there is no illumination incident on the sensing area of the array. When there is no illumination, there will be no appreciable amount of charge leaked off during a frame time (FIG. 3M). When the row pulse 14 (FIG. 1B) is applied, the diode remains in a reverse biased non-conductive condition (FIG. 3N). With the application of a column pulse 18, the diode is exposed to a zero bias. Removal of the column pulse followed by removal of the row pulse results in the original bias condition (FIG. 3P) with substantially no net current flow and thus with no significant output signal.

The construction of the above described array can be accomplished with the use of solid state circuit techniques. One possible configuration using a silicon crystal wafer can be employed wherein an array of p-type islands is diffused into a substrate wafer of n-type silicon to form an array of p-n junctions. The entire surface containing the diodes is oxidized and metal lands, interconnected across the array in a plurality of vertical lines, are deposited to form the columns. The oxide layer forms the dielectric of the capacitor in series with the junction. On the opposite face of the silicon substrate are deposited a plurality of thin metallic strips in the horizontal direction, orthogonal to the first set of strips, to form the rows. The rows are mutually aligned such that their respective cross over areas overlie the respective p-n junction regions. Thus, at each intersection of a row and column conductor, a capacitor p-n junction series connection is formed.

The foregoing described construction requires that the thickness of the wafer be of the same order of magnitude or smaller than the separation between the rows of diodes to prevent lateral spreading of the interrogating scanning potential. It may also be required that rows adjacent to the interrogated row be maintained in a reverse biased condition by means of a low impedance switch. To avoid the difficulty an alternative construction may be employed, using an isolation diffusion structure, illustrated in FIGS. 4 and 5. Here, n-regions are diffused into a p-substrate to form a set of strips of n-material, thus creating rows which are electrically isolated from one another. The p-regions are then diffused into these rows in a plurality of islands, as before, to form the anodes of the p-n junction diode array. The array is again covered by an oxide. The column interconnections are deposited on the oxide in horizontal rows parallel to one another and overlying the p-n junctions. Standard diffusion and deposition techniques may be employed, with silicon material as the base, and with a suitable oxide material such as silicon dioxide forming the oxide layer. Incident light can be applied to the back side of the device, as shown in FIG. 5, or to the front side, in either case each of the diodes storing a proportional segment of the light incident thereon.

Interrogation of the solid state array is accomplished as described above with the scanning pulse pattern of FIG. 1B.

It is understood that the pulse application may be effected by means of any suitable means. The desired pulse generation pattern can be derived from tapped delay line structures or by known digital techniques such as a binary counter circuit employing flip-flops with a multi-terminal decoding gate or a single row of monostable multivibrators arranged to be mutually triggering. Also, other pulse scanning patterns can be used, the row and column pulse scan timing can be interchanged, and the voltage magnitudes and relationships can vary within the framework of the invention.

Finally, although a solid state configuration has been disclosed as a preferred means of constructing the array, it is understood that macroscopic discrete components can be wired together to form the array.

Although certain embodiments and descriptions have been provided, it is to be understood that various further modifications, omissions and refinements which depart from the disclosed embodiments may be adopted without departing from the spirit and scope of the invention.

What is claimed is:

1. A storage device for incident illumination comprising an array of two terminal elements arranged in rows and columns, each of said elements including a series combination of a photosensitive p-n junction and a capacitor, scanning means for cyclically and sequentially charging each of said capacitor-diode circuits in a sense which provides a reverse bias on the diode associated with each of said capacitors, each of said p-n junctions being responsive to incident illumination to leak off a charge to a degree directly proportional to the photon quantity of said incident illumination, and means responsive to the recharging of each of said capacitor-diode circuits during the next successive scan for providing an output signal indicative of said leaked charge.

2. A storage device for retaining a characteristic of incident illumination comprising an array of two terminal elements arranged in rows and columns, each of said elements including the series combination of a photosensitive p-n junction and a capacitor, a first plurality of conductive means respectively interconnecting one of said two terminals of each of said elements along a respective plurality of rows, a second plurality of conductive means respectively interconnecting the other of said two terminals of each of said elements along a respective plurality of columns, scanning means for periodically applying a plurality of charging pulses sequentially to each of said elements along said rows and columns for charging each of said two terminal elements in a sense causing each said capacitor to reverse bias the p-n junction associated with said capacitor, each said p-n junction responsive to said incident illumination for leaking a portion of the said charge associated therewith, and means responsive to the restoration of said leaked charge by the next sequential application of charging pulses for providing an output signal indicative of the quantity of leaked charge.

3. The combination of claim 2 wherein said scanning means comprises a first pulse source, means distributing pulses from said pulse source sequentially from column to column along *n* columns, a second pulse source, said second pulse source producing pulses having a duration at least as long as *n* times the duration of the column pulse, and means applying pulse from said second source sequentially from row to row.

4. A method of storing and retrieving optical information from an optical target array of photosensitive p-n diode junctions arranged on a common substrate in rows and columns, each of said p-n junctions having a capacitor connected in series therewith, comprising the steps of cyclically applying a charging pulse to each of the diode-capacitor elements, thereby placing a stored charge on the combined capacitance of each of said elements, applying light to the photosensitive p-n junction associated with said capacitor, thereby leaking off a portion of said stored charge in proportion to the total quantity of light incident on said p-n junction, restoring said stored charge by application of the next successive one of said cyclic charging pulses, and measuring the quantity of charge replaced on said element, thereby providing an indication of the total quantity of light incident on the photosensitive p-n junction associated with said capacitor during the interval betwen successive cyclic charging pulses.

5. The method of claim 4 wherein said charging pulse is applied to each of said diode-capacitor elements by the coincident application steps of sequentially applying a first pulse of a first duration to each of said columns, applying a second pulse with a second duration along each of said rows, said second pulse having a duration equal to the duration of said first pulse multiplied by the number of columns.

References Cited

UNITED STATES PATENTS 2,732,469 1/1956 Palmer -------------- 178—6

TERRELL W. FEARS, Primary Examiner

U.S. Cl. X.R.

178—6; 307—320; 356—215